(12) United States Patent
Vinogradov

(10) Patent No.: US 7,780,088 B2
(45) Date of Patent: Aug. 24, 2010

(54) IMAGING-BASED READER HAVING LIGHT GUIDED ILLUMINATION

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 338 days.

(21) Appl. No.: 11/647,877

(22) Filed: Dec. 29, 2006

(65) Prior Publication Data
US 2008/0156880 A1 Jul. 3, 2008

(51) Int. Cl.
G06K 7/10 (2006.01)

(52) U.S. Cl. .............. 235/462.42; 235/462.41; 235/454

(58) Field of Classification Search ....... 235/462.01, 235/462.42, 473; 362/26, 11; 385/146; 359/8, 359/228, 512, 592, 599, 503, 894; 250/216, 250/227.11, 227.29
See application file for complete search history.

(56) References Cited

U.S. PATENT DOCUMENTS

| 4,594,645 | A | * | 6/1986 | Terashita | 362/18 |
| 5,177,802 | A | * | 1/1993 | Fujimoto et al. | 382/124 |
| 5,422,472 | A | * | 6/1995 | Tavislan et al. | 235/472.01 |
| 5,739,525 | A | * | 4/1998 | Greve | 250/227.11 |
| 5,743,633 | A | * | 4/1998 | Chau et al. | 362/331 |
| 6,033,090 | A | * | 3/2000 | Seo | 235/455 |
| 7,015,640 | B2 | * | 3/2006 | Schaepkens et al. | 313/506 |
| 7,090,132 | B2 | * | 8/2006 | Havens et al. | 235/454 |
| 2003/0095400 | A1 | * | 5/2003 | Kashima et al. | 362/31 |
| 2006/0098433 | A1 | * | 5/2006 | Chaleff et al. | 362/235 |
| 2006/0245213 | A1 | * | 11/2006 | Beil et al. | 362/616 |
| 2006/0291065 | A1 | * | 12/2006 | Hasei et al. | 359/619 |
| 2009/0206243 | A1 | * | 8/2009 | Eisen | 250/227.11 |

FOREIGN PATENT DOCUMENTS

JP 2004-311388 * 11/2004

* cited by examiner

Primary Examiner—Michael G Lee
Assistant Examiner—Keith Goodman, Jr.

(57) ABSTRACT

An illumination assembly for emitting light for imaging a target object having an illumination source that emits at least one light beam upon activation toward an illumination guide. The illumination guide has a first and a second side such that the light beam from the illumination source is scattered between the first and second sides. A textured surface is located substantially along the first side of the illumination guide. The scattered light exits the illumination guide from the textured surface to form a prescribed illumination pattern for imaging a target object.

25 Claims, 3 Drawing Sheets

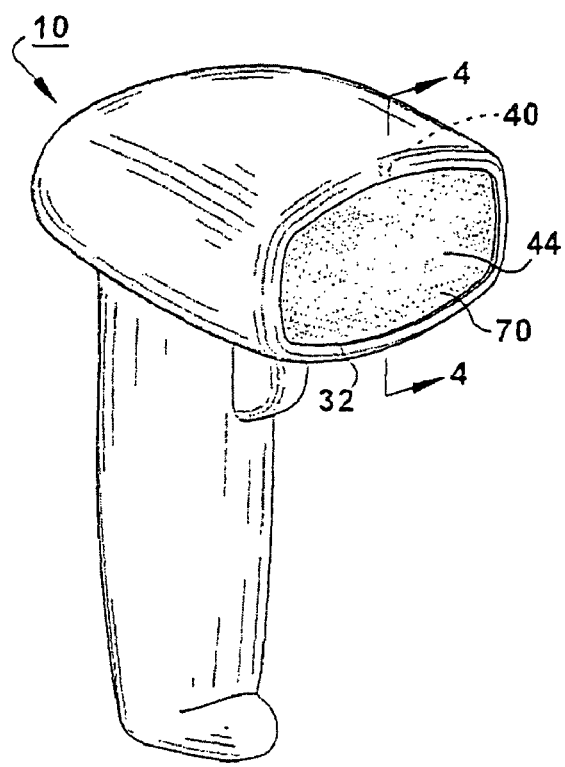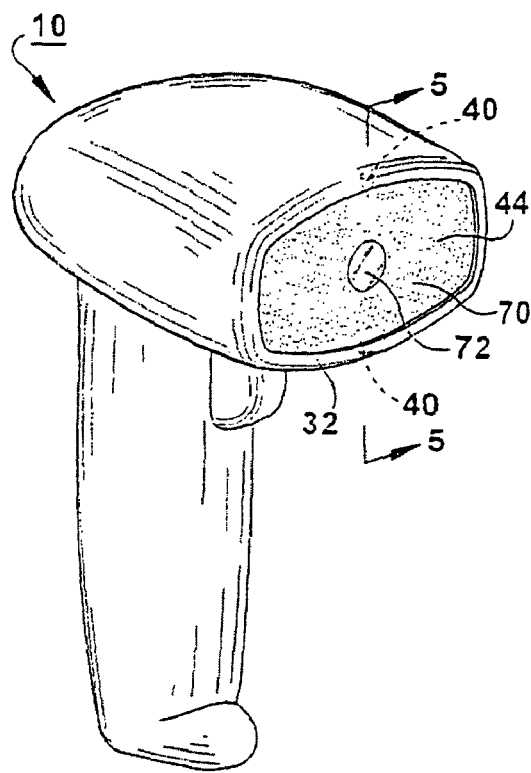
Fig. 3A
Fig. 3B
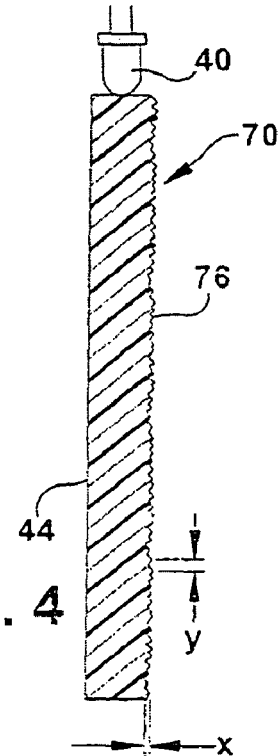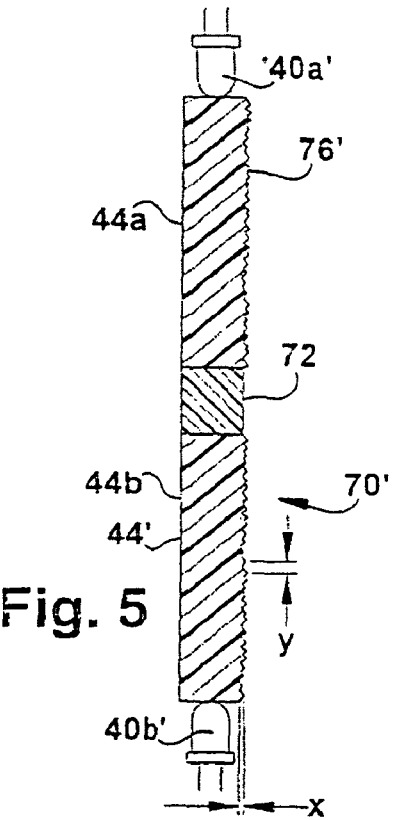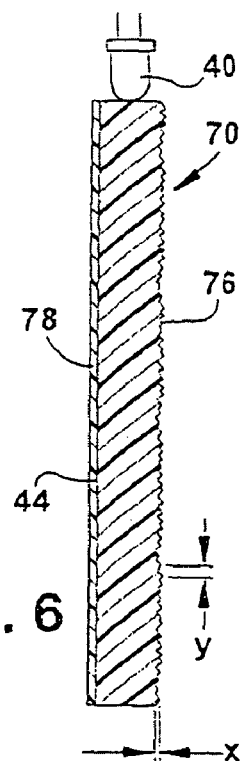
Fig. 4
Fig. 5
Fig. 6

IMAGING-BASED READER HAVING LIGHT GUIDED ILLUMINATION

FIELD OF THE INVENTION

The present invention relates to an illumination system for an imaging-based reader and, more particularly, to an illumination system for an imaging-based bar code reader including an illumination guide that provides uniform illumination having an increased area from which illumination exits the imaging based bar-code reader and directs the exiting light in a predetermined direction toward a target object for imaging.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imagining systems, imaging-based bar code readers or bar code scanners.

Imaging-based bar code reader systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Imaging-based bar code reader systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal is amplified by a gain factor, by for example an operational amplifier or microprocessor. The amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an illumination system to flood a target object with illumination from a light source such as an LED in the reader. Light from the light source or LED is reflected from the target object. The reflected light is then focused through a lens of the imaging system onto the pixel array, the target object being within a field of view of the lens. It is not uncommon for a single reader to employ multiple LED sources or a bank or cluster of LEDs in order to achieve the amount of illumination necessary for a successful reflection from the target object. Such configurations are often costly to manufacture, and also undesirably, demand increased power requirements, thus reducing battery life on portable readers. In addition, multiple LED sources may create non-uniform illumination with hot spots in the image, i.e. local areas of bright light What is needed is a cost effective imaging-based bar code reader system capable of generating an illumination pattern having a sufficient lighting to produce a successful image from the target object, while minimizing power requirements, maximizing the systems efficiency.

SUMMARY

In accordance with one example embodiment of the present invention, an illumination assembly for emitting illumination for imaging a target object, the imaging assembly comprises an illumination source that emits at least one light beam upon activation toward an illumination guide. The illumination guide has a first and a second side, the light beam from the illumination source being diffused between the first and second sides. A textured surface is located substantially along the first side of the illumination guide. The diffused light exits the illumination guide from the textured surface to form a prescribed illumination pattern for imaging a target object.

In accordance with another example of the present invention, a method for imaging a target object comprises the steps of energizing an illumination source to form a light beam and positioning the illumination source in contact or close proximity to an illumination guide having first and second side, one of the sides has a textured surface while the other of the sides has a smooth surface. The method further comprises diffusing the light beam through the illumination guide and influencing the diffused light beam to exit from the illumination guide through the textured surface forming a controlled illumination pattern for imaging a target object.

In accordance with yet another example of the present invention, an imaging system for directing an illumination pattern at a target object when the system is actuated comprises a pixel array and a focusing lens to focus an image of the target object onto the pixel array. The system further comprises an illumination source emitting at least one light beam upon activation toward an illumination guide, the illumination source is in contact with the illumination guide. The illumination guide has a first and a second side, the light beam from the illumination source being diffused by the illumination guide between the first and second sides. A textured surface is located substantially along one of the sides and the other of the sides has a relatively smooth surface. The diffused light exits the illumination guide from the textured surface to form a prescribed illumination pattern at a target object.

BRIEF DESCRIPTION OF THE DRAWING

The foregoing and other features and advantages of the present invention will become apparent to one skilled in the art to which the present invention relates upon consideration of the following description of the invention with reference to the accompanying drawings, in which:

FIG. 3A is perspective view of an imaging-based bar code reader constructed in accordance with one embodiment of the claimed invention;

FIG. 3B is a perspective view of an imaging-based bar code reader constructed in accordance with one embodiment of the claimed invention;

FIG. 4 is a sectional view of an illumination guide as depicted along line 4-4 in FIG. 3A;

FIG. 5 is a sectional view of an illumination guide as depicted along line 5-5 in FIG. 3B; and FIG. 6 is a sectional view of an illumination guide in accordance with one embodiment of the claimed invention.

DETAILED DESCRIPTION

Figure 1:
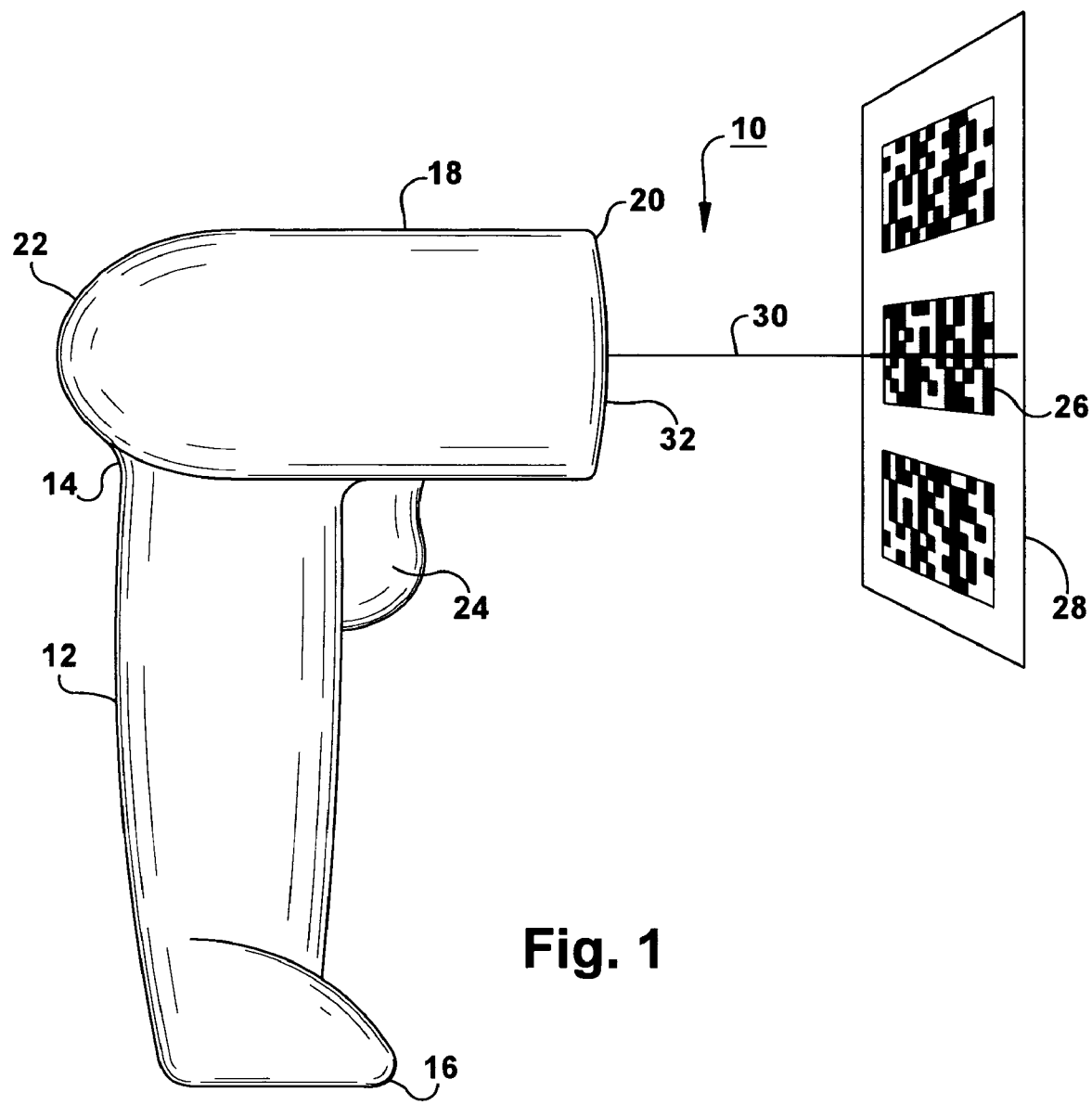
FIG. 1 is an elevated view of an imaging-based bar code reader reading a series of bar codes from a "pick list"

An elevated side-view of an imaging-based reader 10 is depicted in FIG. 1. A typical profile of the portable bar code reader 10 is physically shown that uses an internal power source such as a battery, but could be a reader having a wire connection from which power is supplied, or remotely powered through an induction system without departing from the spirit and scope of the claimed invention. In addition to imaging and decoding 1D and 2D bar codes, including postal codes, and Code 39 bar codes, the reader 10 is also capable of capturing images and signatures. In one example embodiment, the bar code reader 10 is a hand held portable reader that can be carried and used by a user walking or riding through a store, warehouse, or plant, while reading bar codes for stocking and inventory control purposes. However, it should be recognized that the imaging-based bar code reader 10 of the present invention, to be explained below, may be advantageously used in connection with any type of imaging-based automatic identification system including, but not limited to, bar code scanners, signature imaging acquisition and identification systems, optical character recognition systems, fingerprint identification systems and the like. It is the intent of the present invention to encompass all such imaging-based automatic identification systems.

Returning to FIG. 1, the imaging-based bar code reader 10 includes a handle 12, which is located between an upper end 14 and lower end 16 of the reader 10. The reader further includes a reading portion or head 18 situated between a first and second ends 20 and 22, respectively.

Typically located about the upper end 14 of the handle 12 is a trigger 24 that when engaged by an operator initiates the reading of a target object or in this example embodiment, a bar code 26. The trigger 24 is coupled to the reader's circuitry for initiating the reading of the target bar code 26, which is often positioned on an article such as a package, or at times on a pick list 28, as shown in FIG. 1. The pick list 28 includes an array of bar codes with spaces or voids therebetween.

If the reading process is to be manually performed by an operator, the process is typically activated by engaging the trigger 24. However, other reading systems may be automated reading system initiated by an instruction internal to the reading system's software or circuitry. Alternatively, the initiation of the automatic reading system may be continuous once power is supplied to the reader. For either the manual or automatic reading system, an illumination source is energized projecting a first illumination pattern 30 from the first end 20 of the reader 10 through a window 32, as depicted in FIG. 1.

Figure 2:
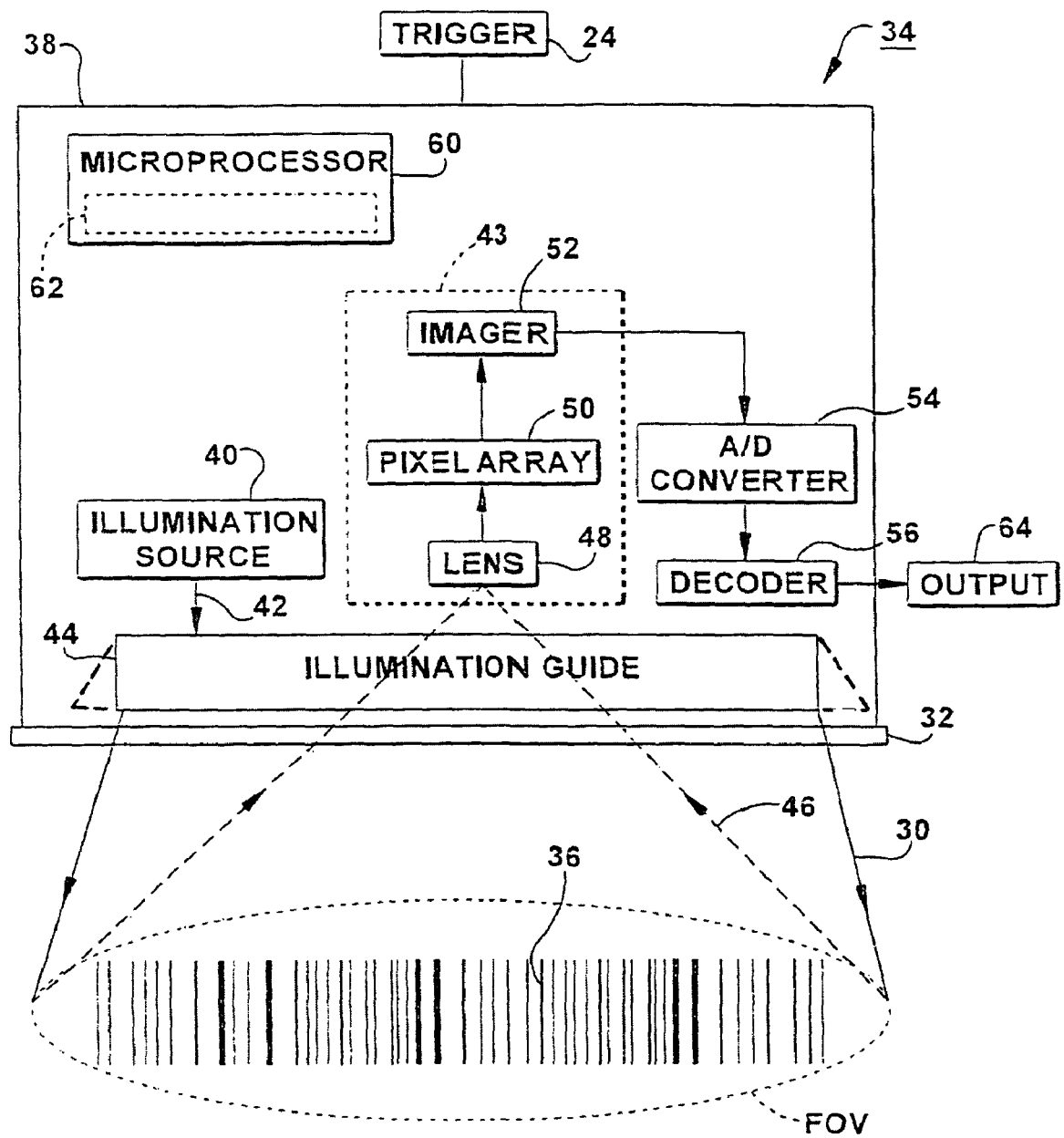
FIG. 2 is a function block diagram of an imaging reader system constructed in accordance with one embodiment of the present invention.

Referring now to FIG. 2 is a functional block diagram of an imaging reader system 34 capturing a target object, this example being a two-dimensional image 36. The system 34 includes several components typically located within the reader 10, but could be remotely located without departing from the spirit and scope of the claimed invention.

Functioning as a part of the system 34 is a scan engine 38 that is connected to reading components that perform functions such as imaging, control, and decoding. In this example embodiment, the system 34, including the scan engine 38 is positioned within the head 18 and handle 12 of the reader 10. The engagement of the trigger 24 initiates an illumination source 40 that results in the emission of a light beam 42. In an automatic reader, the trigger 14 could be omitted since the light beam is typically enabled once power is supplied to an imaging-based reader 10. The illumination source 40 may be any device capable of producing a light beam 42, for example an LED or cold cathode lamp (CFL) would be suitable devices.

The light beam 42 is scattered by an illumination guide 44 that projects the illumination pattern 30 through the window 32 toward the barcode. It is desirable to have the illumination pattern 30 match or fill the field of view (FOV) of an imaging camera 43 located within the reader 10. The illumination pattern 30, illuminates the target object 26. The target object 26 scatters the light forming an image 46 that is captured by the imaging camera 43. The scattered light from the target object 26 is redirected back toward the reader 10 through the window 32 and illumination guide 44, and is altered by a lens 48 connected to the imaging camera 43. The image 46 is then formed or focused by the lens 48 and is directed onto a multi-dimensional pixel array 50, filling the pixel array sensors with data. The lens 48 focuses or forms the image 46 onto the pixel array 50, which is tied and captured to an imager 52. The pixel array 50 and imager 52 are additional components that construct the imaging camera 43 that is located inside the reader 10. The multi-dimensional pixel array 50 produces a data grid corresponding to the image 46 from the target object 36. It should be appreciated by those skilled in the art that the pixel array 50 and imager 52 could be either a charged coupled device (CCD) or complementary metal oxide semiconductor (CMOS) based imaging type both having multi-dimensional array of sensors that sense the image 46 and form pixel data corresponding to the image of the target object 36.

An analog to digital ("A/D") converter 54 located in the scan engine 30, receives the stored analog image from the imager 52. The A/D converter 54 then sends a digital signal to a decoder 56 where the signal becomes synthesized by the decoder's internal circuitry. An example of such a sensor is Micron Technology Inc. CMOS image sensor part number MT9M001. However, the A/D converter 54 and decoder 56 do not have to be incorporated into the scan engine, and may be housed in separate scanner components. The scan engine 30 is associated to a microprocessor 60 that is connected to the imaging reader 10. The microprocessor 60 assists in processing and decoding the image into a data stream through firmware 62. The firmware 62 is embedded within the microprocessor 60 or scan engine 30 onto for example, flash Read Only Memory (ROMs) or as a binary image file that can be programmed by a user. Alternatively, the scan engine could employ an application specific integrated circuit (ASIC).

If the decode process executed within the decoder 56 is successful, the decode session may be terminated with the decoded information being transmitted to an output 64, which could be tied to a number of reader peripherals. These could include for example, visual display devices such as a monitor or LED, a speaker, or the like.

FIG. 3A illustrates a perspective view of an imaging-based bar code reader 10 constructed in accordance with one embodiment of the claimed invention. The first end 20 of the head 18 is in view showing a circular-shaped window 32. Located internally and behind the window 32 is a circular-shaped illumination guide 44 having a textured or crenulated surface 70. While a circular shaped window 32 and illumination guide 44 are shown, the structures could be any geometrical shape without departing from the spirit and scope of the claimed invention. For example, the illumination guide could be circular, elliptical, or square. In addition, the scattering of the light by the illumination guide 44 could also be achieved by the geometrical shape of the guide. For example, a prism or wedge shaped illumination guide 44 could also be used to produce the scattered light effect as illustrated in phantom in FIG. 2.

FIG. 3B illustrates a perspective view of an imaging-based bar code reader 10 constructed in accordance with one embodiment of the claimed invention. Similarly oriented with the reader of FIG. 3A, the reader 10 of FIG. 3B provides a view of the window 32. However, the example embodiment of FIG. 3B further provides an area of discontinuity 72 located substantially about the center of the circular-shaped illumination guide 44. The area of discontinuity 72 could however be positioned and assume any geometrical shape within the illumination guide 44 without departing from the spirit and scope of the claimed invention.

The area of discontinuity 72 could be a through aperture in the illumination guide 44 or a section of material (optical transmission material) differing in composition from the type of material used for the illumination guide that would allow for uninhibited transmission of the image 46. Alternately, the area of discontinuity could be from the same material as the illumination guide 44, but the surface would lack texturing. An example of a suitable transmission material includes clear glass, plastic, or any optically translucent/transparent media. The illumination guide 44 further provides a dust seal, protecting the scan engine components from debris typically produced from external environments.

Referring now to FIG. 4 is a section view of the illumination guide 44 along line 4-4 as shown in FIG. 3A. A single illumination source 40 is shown as being coupled to the illumination guide 44. More specifically, the illumination source can be attached to, or in close proximity to the illumination guide 44 such that light passes through the guide and exiting through the textured, rough, or crenulating surface 70 in a scattered and predetermined direction toward the target object 26. The illumination guide 44 is a plate-like structure, typically having a thickness or width that is much smaller relative to its height. The illumination guide 44 is made from optically translucent material and the typical thickness or width is very small ranging up to a few millimeters. The illumination guide's width is defined by two sides, where the sides could be parallel to each other or one side could include a small wedge.

The textured surface 70 is a microstructure that enhances the illumination pattern 30 by scattering the light toward the target object 26. Such configuration eliminates the need for LED banks and clusters that are both costly and power consuming. In addition, the illumination guide 44 provides uniform illumination background and scatters the light over a larger area. In applications where the target object 26 is located on a shiny reflective surface such as surgical instruments or displays of cell phones, it is constructive to have a large illumination system, which the illumination guide 44 provides. The imaging camera 43 of the reader 10 captures the image of the target object 26 with the illumination system reflected on the background from the shiny surface of the object on which the target object appears. The light from the target object itself is scattered or absorbed and appears as dark features in the image 46. The image 46 is further enhanced due to the reflection of the target object's supporting surface.

The textured surface 70 includes a plurality of ridges 76 each having a microstructure height x and a pitch distance y. The illumination guide 44 is made from any material capable of scattering the light beam 42 into the desired illumination pattern 30. Examples of suitable materials include any optically translucent materials, isotropic materials, translucent plastic, and etched glass.

The textured surface 70 is a microstructure surface providing a desirable degree of light scattering at the target object 26. The textured surface could be integrated into the illumination guide 44 or added to the surface of the guide as a separate substrate. An example of a suitable microstructure surface would include a surface having a pitch distance and microstructure height ranging from a few microns up to a half of a millimeter. The illumination guide 44 material and construction can be such that allows the reflected image 46 (the image of the target or scattered light from the target 26) 46 to pass unaffected through the guide into the lens 48 without degradation to the reflected image as shown in FIG. 2.

Alternatively, the example embodiment depicted in FIGS. 3B and 5 include an area of discontinuity 72 for receiving the reflected image 46. FIG. 5 shows the alternative embodiment of the imaging-based bar code reader 10 such that objects previously discussed operating in a similar fashion are denoted with the addition of a prime next to the reference character. The illumination guide 44' includes a first and a second section 44a and 44b, respectively. The sections 44a, 44b may be continuous, if for example the illumination guide 44' is circular-shaped as shown in FIG. 3B. Alternatively, depending on the illumination guide 44' geometry, the sections 44a, 44b, may be separate, as the case for a rectangular shaped guide.

In the illustrated embodiment the area of discontinuity 72 is centrally located about the illumination guide 44', but could be located at any location along the illumination guide. The area of discontinuity 72 could be any material differing from the illumination guide 44' that provides enhanced transmission of the reflected image 46 through the illumination guide, for example clear glass. Alternatively, the area of discontinuity could be an aperture or void in the illumination guide 44' creating a passage for the reflected image 46 or be made from the same material as the illumination guide but without a textured surface. When a material is used in the area of discontinuity 72 it provides a secondary function, acting as a protective shield by preventing debris and other foreign objects from entering the imaging-based reader 10 that pass beyond the window 32. Both the first and second sections 44a, 44b may have a respective illumination source 40a', 40b', or be illuminated by a single illumination source similarly attached to, or in close proximity to one of the first or second sections. Alternatively, any number of illumination sources could be used around the perimeter of the illumination guide depending on the amount of illumination required for the desired application.

FIG. 6 illustrates an example embodiment constructed in accordance with the claimed invention in which the illumination guide 44 includes a diffused screen 78 in contact or connected to the illumination guide along the interior side of the reader 10. The diffuse screen 78 enhances the light uniformity and efficiency of the guide 44. The diffuse screen may further enhance the scattering of light achieved by the illumination guide 44 by making the diffuse screen 78 from optically non-transparent material accomplished by the addition of color, such as white or a color consentient with the color of the LED(s) for producing the light. For example, if a red LED is used, the diffuse screen 78 may be similarly colored red.

While the present invention has been described with a degree of particularity, it is the intent that the invention includes all modifications and alterations from the disclosed design falling with the spirit or scope of the appended claims.

I claim:

1. An apparatus comprising:
   a) an illumination source emitting at least one light beam upon activation toward an illumination guide, the illumination source being in close proximity to said illumination guide;
   b) said illumination guide having first and second sides, the light beam from said illumination source being scattered between said first and second sides; and
   c) a textured surface located substantially along said first side of said illumination guide, the scattered light exiting said illumination guide from said textured surface to form a prescribed illumination pattern for imaging a target object;
   d) a discontinuous area surrounded by the textured surface on the illumination guide; and
   e) an imaging camera located behind the discontinuous area of the illumination guide to receive reflected scattered light from the target object through the discontinuous area, wherein a center ray of the field of view (FOV) of the imaging camera is substantially perpendicular to the textured surface of said first side of said illumination guide.

2. The apparatus of claim 1, wherein said textured surface includes crenulated structures ranging from one micron to one-half millimeter in size.

3. The apparatus of claim 1, wherein said textured surface is integral to said illumination guide.

4. The apparatus of claim 1, wherein said textured surface is a substrate that is applied to one of said sides of said illumination guide.

5. The apparatus of claim 1, wherein said illumination source is a light emitting diode or cold cathode lamp.

6. The apparatus of claim 1, wherein said illumination source is a plurality of light emitting diodes.

7. The apparatus of claim 1, wherein said illumination guide is made from glass and said textured surface includes etching selectively formed into said glass.

8. The apparatus of claim 1, wherein said illumination guide is made from an isotropic translucent material.

9. The apparatus of claim 1, wherein said illumination guide is made from a translucent plastic.

10. The apparatus of claim 1, wherein said discontinuous area includes a material capable for transmission of a reflected scattered light.

11. The apparatus of claim 10, wherein said material capable for transmission of reflected scattered light is smooth optical media.

12. The apparatus of claim 1, wherein said discontinuous area is an aperture located substantially about the center of said illumination guide.

13. A method for imaging a target object, the steps of the method comprising:
   a) energizing an illumination source to form a light beam;
   b) positioning said illumination source in close proximity to an illumination guide having first and second sides, one of said sides having a textured surface while the other of said sides having a smooth surface;
   c) propagating and scattering said light beam through said illumination guide;
   d) influencing the scattered light beam to exit from said illumination guide through said textured surface forming a controlled illumination pattern for imaging a target object ; and
   e) receiving reflected scattered light from the target object by an imaging camera through a discontinuous area that is surrounded by the textured surface on the illumination guide, wherein a center ray of the field of view (FOV) of the imaging camera is substantially perpendicular to the textured surface of said first side of said illumination guide.

14. The method for imaging a target object of claim 13, wherein the step of influencing the scattered light beam is accomplished by providing crenulating structures along said textured surface ranging from one micron to one-half millimeter in size.

15. The method for imaging a target object of claim 13 further comprising positioning an aperture substantially about the center of said illumination guide such that said aperture acts as said area of discontinuity by allowing reflected light from the target object to freely transmit through the illumination guide onto an imaging array.

16. An imaging system for directing an illumination pattern at a target object when the system is actuated, the system includes a pixel array and a focusing lens to focus an image of the target object in the field of view (FOV) of the imaging system onto the pixel array, the system further comprising:
   at least one illumination source emitting at least one light beam upon activation toward an illumination guide, the illumination source being in close proximity to said illumination guide;
   said illumination guide having first and second sides, the at least one light beam from said at least one illumination source being diffused by the illumination guide between said first and second sides;
   a textured surface located substantially along one of said sides and said other of said sides having a relatively smooth surface, the diffused light exiting said illumination guide from said textured surface to form a prescribed illumination pattern scattering the light toward a target object; and
   a discontinuous area, surrounded by the textured surface on the illumination guide, for passing through reflected scattered light from the target object toward the pixel array, wherein a center ray of the field of view (FOV) of the imaging system is substantially perpendicular to the textured surface of said first side of said illumination guide.

17. The imaging system of claim 16, wherein said illumination guide is circularly-shaped.

18. The method for imaging a target object of claim 16, wherein said positioning said illumination source is positioned in contact to said illumination guide.

19. The illumination assembly of claim 16, wherein said illumination pattern is enhanced by a light diffusing screen coupled with said second side of said illumination guide for improving the uniformity of said illumination pattern.

20. The illumination assembly of claim 19, wherein said light diffusing screen is colored white.

21. The illumination assembly of claim 16, wherein said illumination guide is wedge-shaped.

22. An imaging system for directing an illumination pattern at a target object when the system is actuated, the system comprises
   at least one illumination source emitting at least one light beam upon activation toward an illumination guide, the illumination source being in close proximity to a subtending edge forming a perimeter surface of said illumination guide;
   said illumination guide having first and second sides divided by said subtending edge, the at least one light beam from said at least one illumination source being diffused by the illumination guide between said first and second sides;

a textured surface located substantially along one of said sides and said other of said sides having a relatively smooth surface, the diffused light exiting said illumination guide from said textured surface to form a prescribed illumination pattern transverse to said light beam for scattering the light toward a target object;

a discontinuous area surrounded by the textured surface on the illumination guide; and an imaging camera located behind the discontinuous area of the illumination guide to receive reflected scattered light from the target object through the discontinuous area, wherein a center ray of the field of view (FOV) of the imaging camera is substantially perpendicular to the textured surface of said first side of said illumination guide.

23. The imaging system of claim 22 wherein the diffused light exiting said illumination guide from said textured surface to form a prescribed illumination pattern is transverse to said light beam and said one of said sides for scattering the light toward a target object.

24. The illumination assembly of claim 22, wherein the diffused light exiting said illumination guide from said textured surface to form a prescribed illumination pattern is substantially orthogonal to said light beam and transverse to said one of said sides for scattering the light toward a target object.

25. An imaging system for directing an illumination pattern at a target object when the system is actuated, the system includes a pixel array and a focusing lens to focus an image of the target object in the field of view (FOV) of the imaging system onto the pixel array, the system further comprising:

at least one illumination source emitting at least one light beam upon activation toward an illumination guide, the illumination source being in close proximity to a subtending edge forming a perimeter surface of said illumination guide;

said illumination guide having first and second sides divided by said subtending edge, the at least one light beam from said at least one illumination source being diffused by the illumination guide between said first and second sides, the first and second sides of said illumination guide having lengths a plurality of times a width of the subtending edge;

a textured surface located substantially along one of said sides and said other of said sides having a relatively smooth surface, the diffused light exiting said illumination guide from said textured surface to form a prescribed illumination pattern transverse to said light beam for scattering the light toward a target object; and a discontinuous area, surrounded by the textured surface on the illumination guide, for passing through reflected scattered light from the target object toward the pixel array, wherein a center ray of the field of view (FOV) of the imaging system is substantially perpendicular to the textured surface of said first side of said illumination guide.

* * * * *